Figure 1:
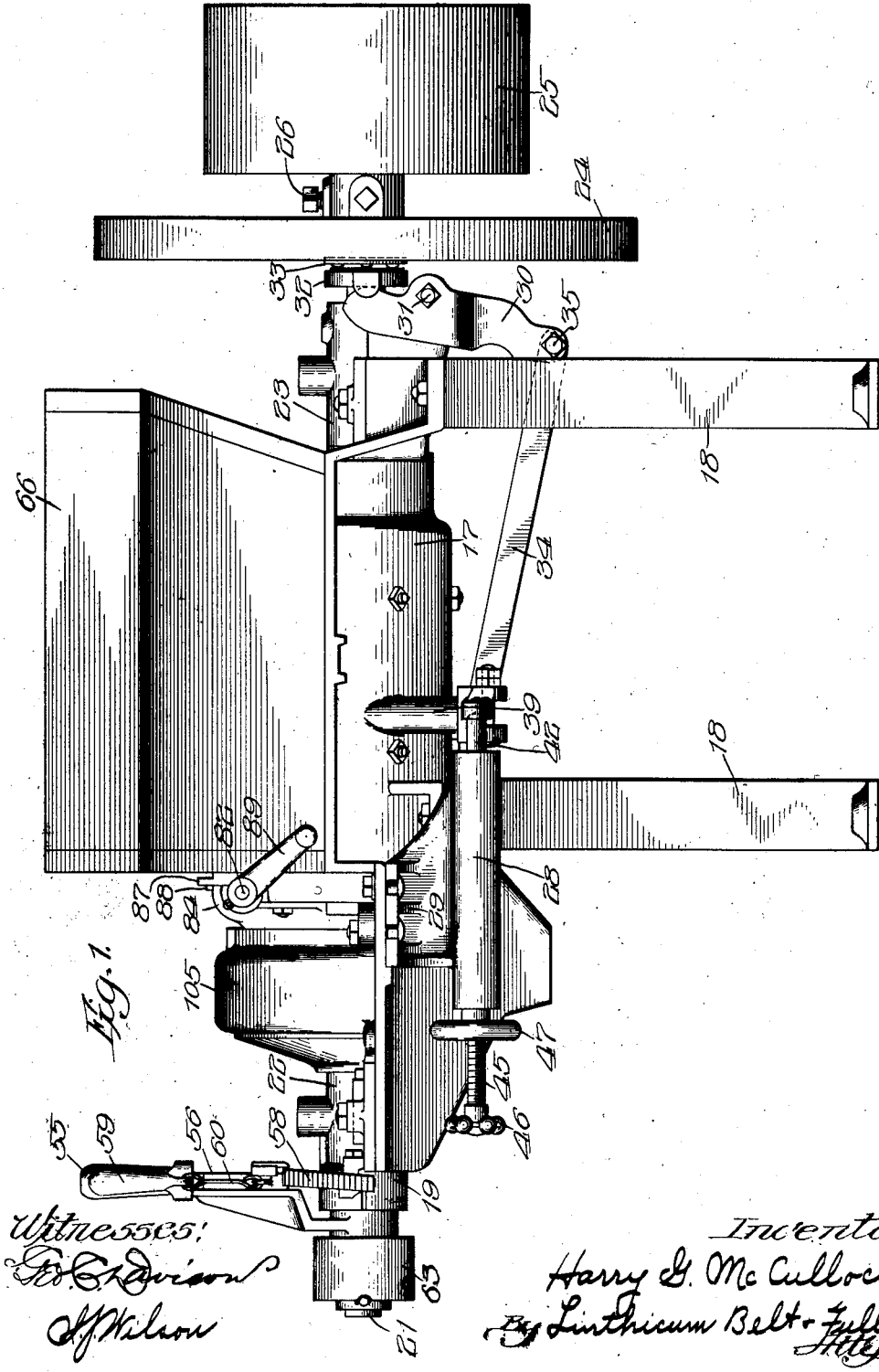

H. G. McCULLOCH.
FEED MILL.
APPLICATION FILED MAY 23, 1910.

1,037,951.

Patented Sept. 10, 1912.
6 SHEETS—SHEET 1.

Witnesses:
Geo. E. Davison
S. J. Wilson

Inventor:
Harry G. McCulloch
By Linthicum Belt & Fuller
Attys

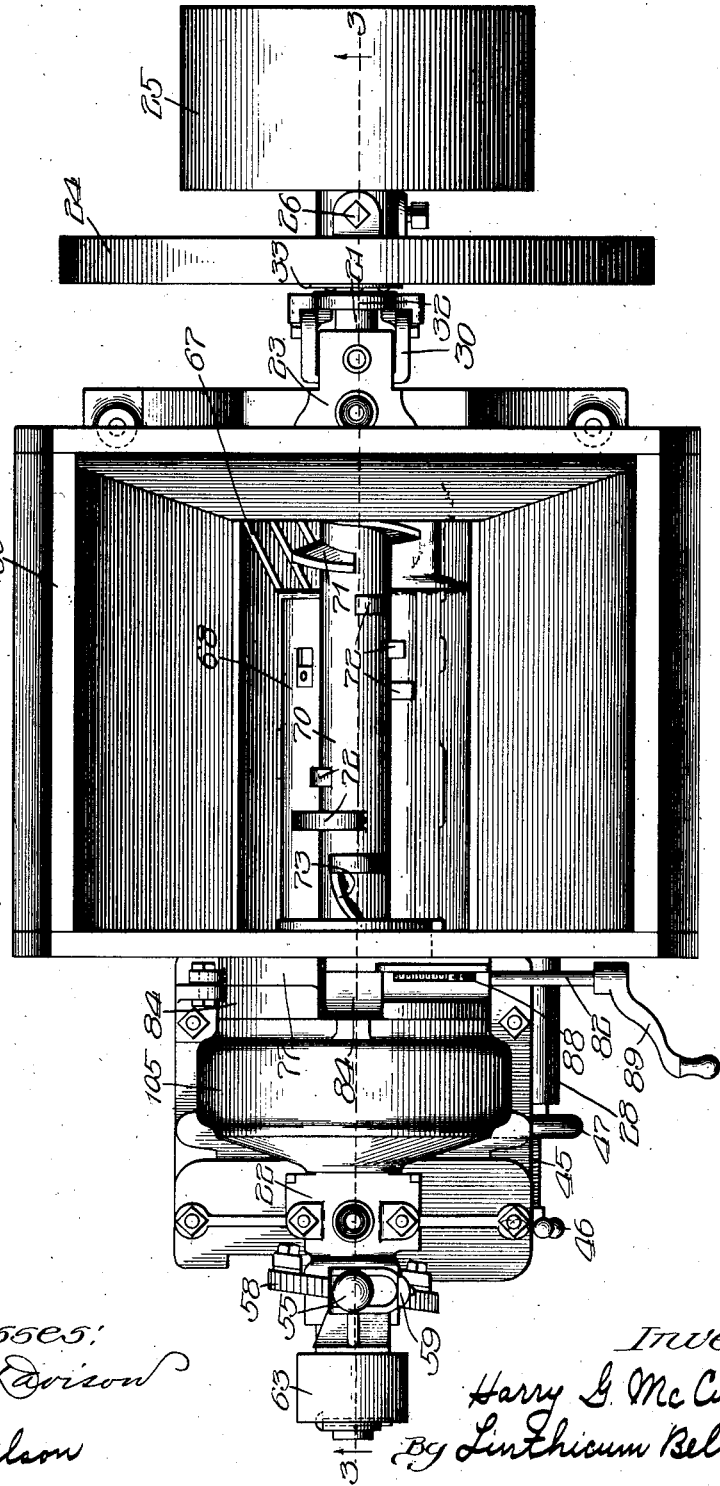

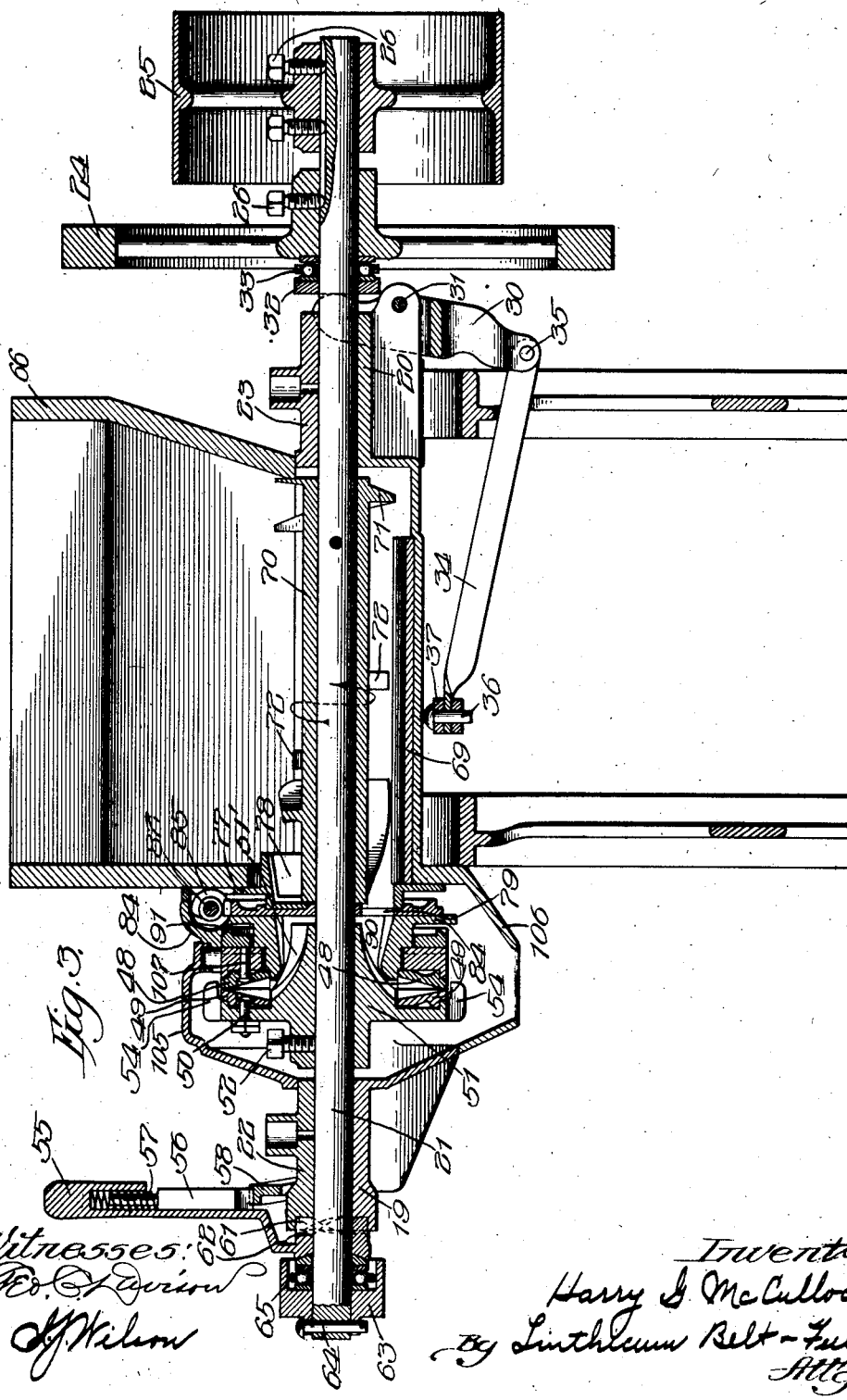

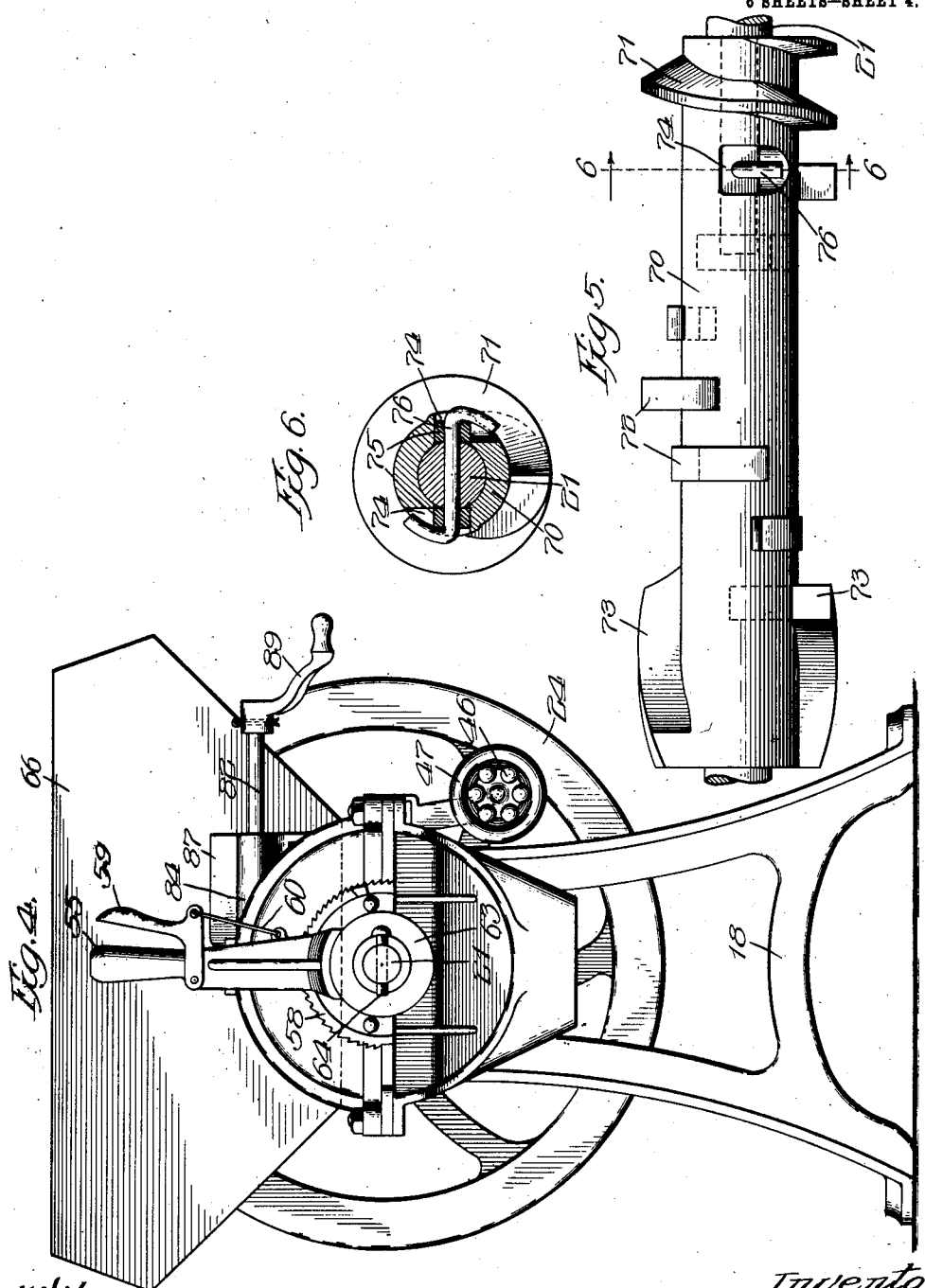

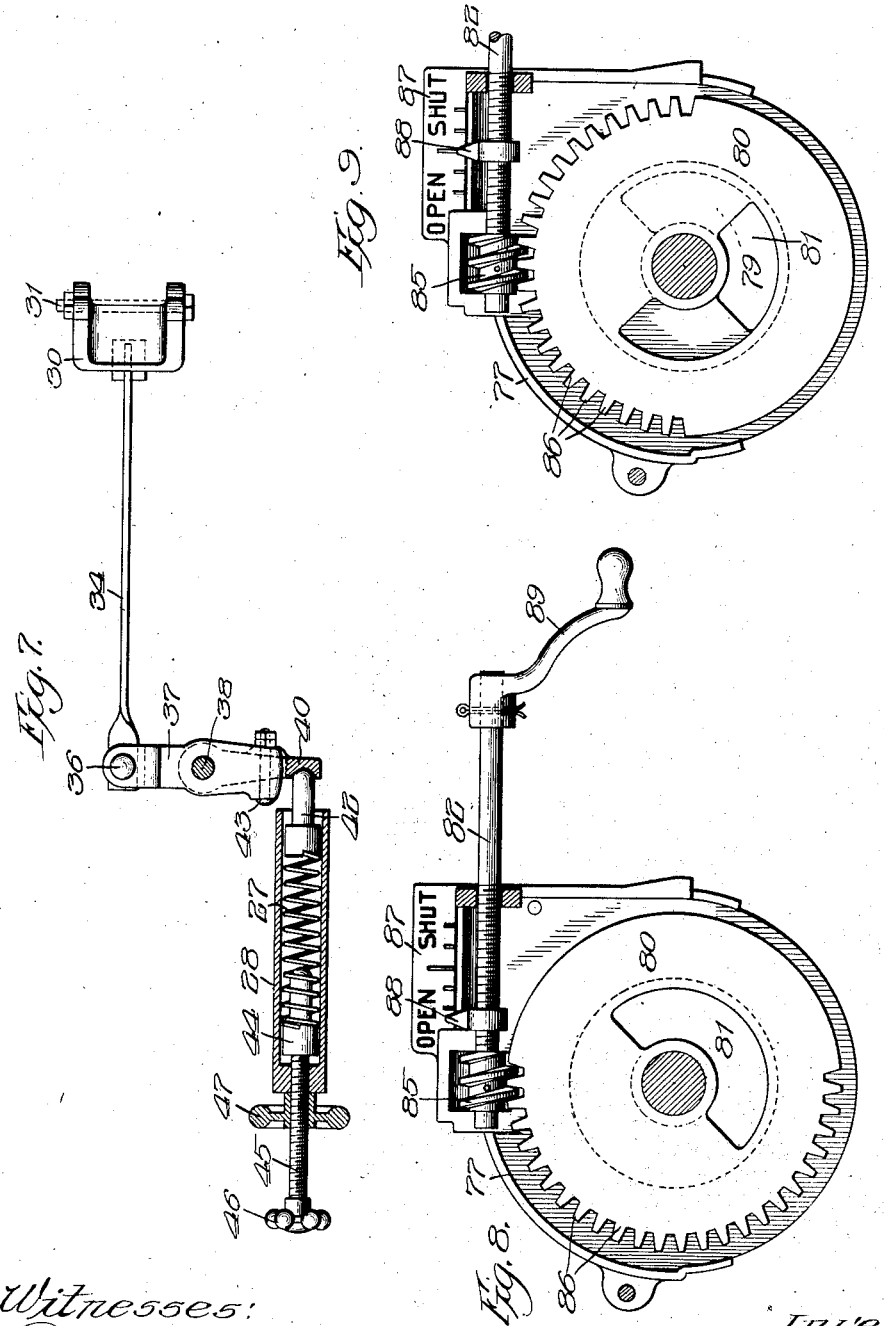

H. G. McCULLOCH.
FEED MILL.
APPLICATION FILED MAY 23, 1910.
1,037,951.
Patented Sept. 10, 1912.
6 SHEETS—SHEET 6.
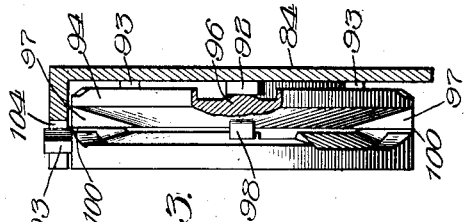
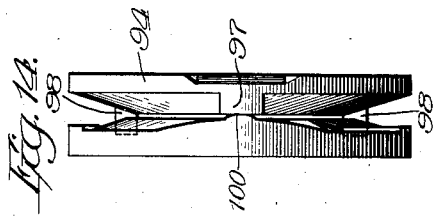
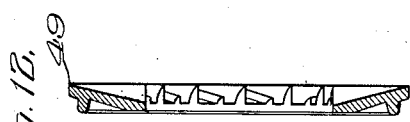
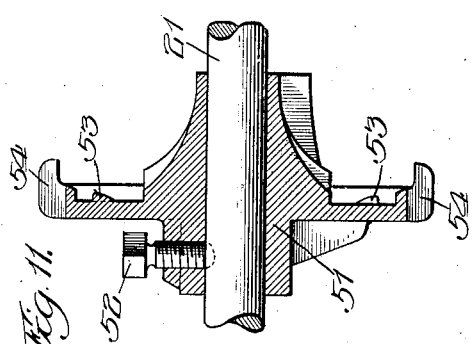
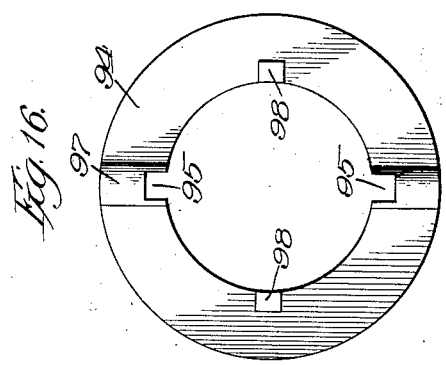
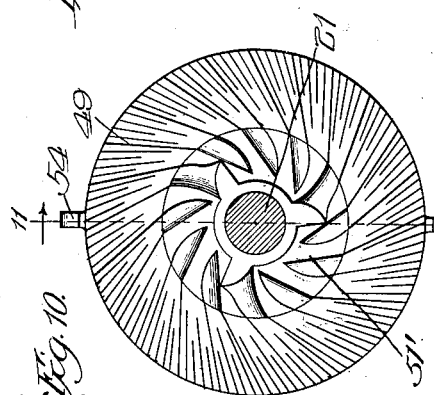
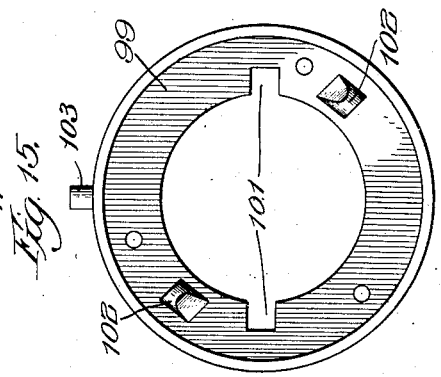
Witnesses:
Inventor:
Harry G. McCulloch
By Linthicum Belt + Fuller
Attys.

UNITED STATES PATENT OFFICE.

HARRY G. McCULLOCH, OF FREEPORT, ILLINOIS, ASSIGNOR TO THE STOVER MANUFACTURING COMPANY, OF FREEPORT, ILLINOIS, A CORPORATION OF ILLINOIS.

FEED-MILL.

1,037,951.  Specification of Letters Patent.  Patented Sept. 10, 1912.

Application filed May 23, 1910. Serial No. 562,856.

*To all whom it may concern:*

Be it known that I, HARRY G. McCULLOCH, a citizen of the United States, residing at Freeport, in the county of Stephenson and State of Illinois, have invented certain new and useful Improvements in Feed-Mills, of which the following is a specification.

This invention relates in general to feed mills, and more particularly to mills of a horizontal type wherein the grinding burs are disposed with their grinding faces in a vertical plane.

One of the objects of my invention is the provision of improved adjusting mechanism for regulating the distance between the grinding burs whereby a very fine adjustment may be secured, and by means of which the burs are positively held against nearer approach to each other when in adjusted position, thereby preventing excessive and unnecessary wear upon the burs, such as would result if the grinding faces of the burs were permitted to engage when running at high speed.

Another object is the provision of means for yieldingly urging said burs into and retaining them in as close proximity as is permitted by the adjusting mechanism. By employing means for yieldingly holding the burs in working position, they are permitted to yield upon the entrance of foreign matter between them, such as stones, nails, nuts or pieces of iron, and thereby obviate the danger of breakage which is very likely to occur when burs are held rigidly in working position.

A further object is to provide a device for regulating the force of the yielding means for retaining the burs in operative position so that the burs can be more or less rigidly held in position accordingly as conditions require.

My invention has for another object the provision of an improved feed device for regulating the feed supply to the burs and also the employment in connection with the operating mechanism therefor of an indicating mechanism which indicates the size of the opening through the concealed feed plates.

Still another object is to so connect the cob breaker to the main shaft that the shaft may be capable of longitudinal movement relatively thereto. This construction permits the use of a breaker extending the entire length of the bottom of the hopper so that no material can be choked and clogged between the ends of the breaker and the hopper as would occur if a shorter breaker were used. The connection is also adapted to yield if excessive resistance is offered to the rotation of the breaker, thus obviating the danger of injury to the machine should the breaker be suddenly stopped by the entrance of a large solid body into the hopper.

Additional aims and advantages of my invention will become apparent as it becomes better understood by reference to the following description when taken in connection with the accompanying drawings illustrating a preferred embodiment thereof, while its scope will be more particularly pointed out in the appended claims.

Referring to the drawings—Figure 1 is a side elevation of a feed mill embodying my invention. Fig. 2 is a plan view thereof. Fig. 3 is a section on the line 3—3 of Fig. 2. Fig. 4 is an elevation looking toward the right in Figs. 1 and 2. Fig. 5 is a detail of the cob breaker and its connection with the main shaft. Fig. 6 is a section on the line 6—6 of Fig. 5. Fig. 7 is a detail plan view of the device for yieldingly urging the grinding burs into operative position. Fig. 8 is a detail view showing the feed controlling mechanism in open position. Fig. 9 is a view similar to Fig. 8 showing the feed controlling mechanism partially open. Fig. 10 is a plan view looking at the face of the revolving bur plate and the grinding bur secured thereon. Figs. 11 and 12 are sections on the line 11—11 of Fig. 10, showing the bur separated from its plate. Fig. 13 is an elevation of the rocking bur plates, one of the plates and the bur case being shown partially in section. Fig. 14 is a bottom view of the rocking plates looking at Fig. 13. Fig. 15 is a detail of the rocking bur plate, and, Fig. 16 is a detail of the pivot bur plate.

Referring to the drawings, reference character 17 designates the machine bed or base which is concave in cross-section and is carried upon suitable standards or legs 18. The base is provided with bearings 19 and 20 to support the main shaft 21, the shaft being retained in position in the bearings by the bearing caps 22 and 23, respectively. A fly-wheel 24, and a belt-pulley 25 are secured upon one end of the shaft by set-screws 26 or other preferred fastening means. The shaft 21 is capable of limited longitudinal movement in its bearings and is normally urged toward the right viewing Fig. 3, by an expansion spring 27 mounted in a cylindrical casing 28 having an upwardly extending shoulder 29 adapted to be bolted to the base of the machine, as shown in Fig. 1. A yoke-lever 30 pivoted at 31 near one end of the machine bed, is adapted to engage with a collar 32 loosely mounted upon the main shaft to force the shaft toward the right viewing Fig. 3. Anti-friction ball-bearings 33 are preferably interposed between said collar and the face of the fly-wheel 24. A link 34 is pivotally attached at 35 to the lower end of the yoke-lever and is secured by a pin 36 to the arm 37 of a double-arm lever pivoted at 38 upon a bolt screwed into a downwardly projecting stud 39 integral with the base of the machine. The other arm 40 of the double-arm lever, is pivoted upon the bolt 38 and is provided with a depression adapted to receive one end of a spring arbor 42 against which the spring 27 bears. The arm 37 is cut-away on its lower side to form a depression for the accommodation of the arm 40, and a bolt 43 is passed through both arms as shown in Fig. 7, for the purpose of angularly adjusting the arms 37 and 40 relatively to each other about the pivot bolt 38. A second spring arbor or stud 44 is located near the inner end of the casing 28 to bear against the other end of the spring 27. For the purpose of regulating the force of the spring, the inner end of the casing 28 is threaded to receive an adjusting screw 45 provided with a suitable handle 46 and adapted to bear against the arbor 44. A hand-wheel lock-nut 47 threaded upon the screw 45, serves to lock the adjusting screw and stud in adjusted position. It will be evident that the force of the spring 27 transmitted through the double-arm lever, the link 34, and the yoke-lever 30, will tend to urge the main shaft toward the right, as shown in Fig. 3.

A stationary grinding bur 48 provided with the usual roughened grinding face, is adjustably mounted in grinding position in a manner to be later described. A coöperating revolving grinding bur 49 is rigidly secured by means of bolts or screws 50 upon a bur plate 51 secured upon the main shaft by means of a set-screw 52. The bur plate 51 comprises a corrugated tapering portion 51' terminating in a flat-face portion, as shown in Fig. 11, and is provided with suitable laterally projecting lugs 53 for engagement in corresponding depressions in the back of the bur 49 to prevent rotation of said bur relatively to the bur plate. Fingers 54 upon the periphery of the plate, serve to assist in positioning the grinding bur and in maintaining it in position on the plate.

As has been previously explained, the main shaft is normally urged toward the right by the spring 27, thus tending to bring the grinding face of the bur 49 into engagement with the bur 48. In order to positively limit the extent of the movement of the shaft in this direction under the influence of the expansion spring and to provide for a nicety of adjustment between the grinding burs, I have provided an adjusting handle 55 loosely mounted upon the shaft 21 and adapted to be maintained in adjusted position by a latch 56 normally forced by a spring 57 into engagement with a ratchet or tooth quadrant 58 secured upon the journal-bearing of the machine by bolts or other preferred fastening means. A pivoted latch handle 59 connected with the latch 56 by a link 60, is employed to withdraw the latch from engagement with the quadrant to permit the handle to be actuated. Upon the outer end of the journal-bearing 19 are formed a plurality of cam surfaces 61 which are adapted to engage with a plurality of similar cam surfaces 62 upon the collar-bearing portion of the lever 55 surrounding the main shaft. A cap 63 is secured upon the outer end of the main shaft by means of a pin 64, and interposed between the inner face of the cap and the adjacent face of the collar portion of the lever 55, are suitable ball-bearings 65. When the lever 55 is moved to the right, viewing Fig. 4, the cams 62 will ride over the cams 61 and force the lever and the main shaft to the left, viewing Fig. 3, against the force of the expansion spring 27.

It will be apparent from the above description that the grinding bur 49 is constantly yieldingly urged toward the bur 48 by the spring 27, and that the movement of the shaft and revolving bur toward the stationary bur, is limited and the relative position of the burs adjusted by means of the adjusting lever 55. This positive limitation of the advance of the revolving bur toward the stationary bur by the adjusting lever, permits the grinding faces of the two burs to be brought into substantial contact with each other, and provides a very fine degree of adjustment between the burs. Furthermore, by positively limiting the approach of the burs to any desired position, absolute contact of the burs with each other may be prevented, and excessive and unnecessary wearing of the grinding faces of the burs due to contact with each other, thereby obviated. By yieldingly urging the revolving bur toward the stationary bur and yieldingly maintaining it in adjusted position, a separation of the burs under extraordinary conditions, such as the entrance of bolts, stones, pieces of iron or other foreign matter between them, is permitted. This construction greatly reduces the danger of injury to the machine and the breakage of the burs which is liable to occur when the burs are rigidly maintained in working relation.

A hopper 66, preferably constructed of wood, is secured upon the base of the machine, the concave portion of said base being provided near one end with diagonally disposed ribs 67, as shown in Fig. 2. A large concave plate 68 is secured in the base of the machine, and a small concave plate 69 is mounted thereon to coöperate with the cob breaker 70 mounted on the main shaft for the purpose of breaking the cobs and other coarse material before it enters between the grinding burs. The cob breaker 70, as shown in Fig. 5, is provided at its outer end with a worm 71 which prevents an accumulation of material at that end of the hopper. Disposed in spiral form around the periphery of the breaker, are a plurality of breaking members or lugs 72, and near the inner end of the breaker is provided a pair of spirally disposed wings 73 which tend to force the material to be ground, through a feed plate to be later described, to the grinding burs. Oppositely disposed elongated openings 74 are formed within the walls of the breaker to receive a plurality of gibs or washers 75. A key 76 passed through the washers or gibs and through the main shaft, has its ends bent over as shown in Fig. 6, to lock the breaker against angular movement on the shaft, but permitting relative longitudinal movement between the shaft and the breaker. The breaker extending the entire length of the bottom of the hopper and having one end in proximity to the outer end of the hopper wall, and its other end in proximity to the feed plate, is incapable of longitudinal movement, and the pin and slot connection above described is employed to permit the shaft to move longitudinally to adjust the revolving bur relatively to the stationary bur. The pin 76 is preferably made of relatively soft material adapted to be sheared off if excessive resistance should be offered to the rotation of the breaker such as might occur if some large foreign body should become lodged between the breaker and the concave plates, or the spirally disposed ribs on the base of the machine. The pin, while of sufficient strength to lock the breaker on the shaft under ordinary running conditions, serves as a safety device to prevent injury to the machine if the breaker should be forcibly stopped in the manner above indicated.

A stationary feed plate 77, Figs. 3, 8 and 9, rigidly secured to the main frame, is provided with a throat portion 78 projecting out over the wings 73 on the breaker, which serves to guide the material to be ground to the feed opening 79 with which the plate is provided. An adjustable feed plate 80 loosely mounted on the main shaft in front of the stationary feed plate, is also provided with a feed opening 81 to correspond with the feed opening 79 in the stationary plate. By turning the adjustable plate about the main shaft, the size of the opening through the two plates may be regulated to permit any desired quantity of material to be fed therethrough. The adjusting mechanism for adjusting the plate comprises a shaft 82 journaled in bearings formed in the stationary plate 77 and the bur casing 84, Fig. 3, and provided near its inner end with a worm 85 adapted to mesh with the segmental teeth 86 formed upon the periphery of the adjustable feed plate. The stationary feed plate is extended upwardly and provided with an indicating scale 87 along which the indicator 88 threaded onto the shaft 82, is adapted to travel to indicate the position of the adjustable plate as the shaft is operated through the instrumentality of the handle 89. By turning the handle 89, the plate may be adjusted to provide a feed opening of any desired size, and the exact position of the concealed plate will at all times be indicated upon the scale by the movable indicator 88. In Fig. 8, the feed plates are shown in open position, while in Fig. 9 they are shown about half closed.

Prior to my invention considerable difficulty has been experienced in adjusting the grinding plates so that they will be disposed at all times in absolute parallelism, which is very essential for the production of an even grade of feed and for the most efficient operation of a mill. In order to insure a parallel relation of the plates during the operation of the machine, I have provided an improved mounting for the stationary bur plate so that the bur can automatically adjust itself to the plane of the revolving bur, which mounting will now be described.

The bur case 84 rigidly bolted to the frame of the machine includes a throat 90 disposed concentrically with the main shaft and provided with suitable longitudinally extending ribs, as shown in Fig. 3, within which the tapered portion of the revolving bur plate 51 is adapted to revolve. The upper half of the case is provided with an outwardly projecting annular flange or rib forming an annular recess 91 in the face of the case for the reception of the plates upon which the stationary bur is mounted. As shown in Fig. 13, the back plate of the bur case 84 is provided on either side with a bearing lug 92, and at the top and bottom with outwardly extending guiding studs 93. A pivot bur plate 94 adapted to fit over the throat of the bur case, is provided with recesses 95 shaped to set down over the guiding studs 93 and prevent turning of the plate relatively to the case. The rear face of the pivoted bur plate 94 is also provided with a pair of slight elevations 96 near the edges thereof, to bear against the bearing lugs 92 upon which the pivoted bur plate is adapted to rock, as will be evident from Fig. 13. Adjacent the recesses 95, the bur plate 94 is provided with elevations or bearing surfaces 97, and at an angle of 90° thereto are provided outwardly projecting guiding studs 98. A front bur plate 99 is provided with bearing surfaces 100 on the rear face thereof, adapted to rest upon the bearing portions 97 of the plate 94 with the recesses 101 on the plate 99 positioned over the guiding studs 98, which prevent the plate 99 from turning relatively to the plate 94. The plate 99 is also provided with a radially disposed stud 103 which fits in a slot 104 in the upper wall of the bur case and also serves to prevent the plate from rotating in the bur case. The outer face of the plate 99 is channeled to receive the grinding bur 48 and is provided with shoulders 102 adapted to engage with corresponding depressions on the back face of the grinding bur to prevent turning of the bur. Suitable bolts or rivets 107 are employed to securely fasten the grinding bur upon the rear bur plate 99, as shown in Fig. 3.

It will be evident from the above description that the pivot plate 94 is adapted to rock in a vertical plane upon the bearing surfaces 92 and 96, and that the rear bur plate 99 is adapted to rock in a plane at right-angles to the rocking of the plate 94 upon the bearing surfaces 97 and 100. By this construction, the stationary (i. e. non-rotating) bur 48, which is rigidly secured to the bur plate 99, is permitted to rock in a plurality of planes to automatically adjust itself and assume a position with its grinding face in substantial parallelism with the grinding face of the revolving bur 49.

A bur case cover 105 is adapted to be positioned over the burs to inclose and protect the same, and is cut away at its bottom to form, together with a laterally projecting shelf 106 of the main frame, a discharge passageway for the material which has been ground.

While I have shown and described a preferred embodiment of my invention, it will be obvious that various minor mechanical changes may be made without departing from the spirit of the invention or sacrificing any of the material advantages thereof.

What I claim is:

1. In a feed mill, the combination of a rotatable longitudinally adjustable bur-shaft, bearings therefor, a stationary cam formed on the end of one of the shaft bearings, a cam loosely mounted on said shaft and adapted to coöperate with said stationary cam, a thrust bearing mounted on the shaft and movable therewith against which said movable cam acts, means for adjusting said movable cam about the shaft, and means for locking the cam in adjusted position.

2. In a feed mill, the combination of a rotatable longitudinally adjustable bur-shaft, bearings therefor, means for yieldingly urging said shaft in one direction, a stationary cam formed on one end of one of said bearings, a cam loosely mounted on said shaft coöperating with said stationary cam and adapted to move said shaft in the other direction, a thrust bearing fixed on said shaft against which the said movable cam acts, means for adjusting said movable cam about the shaft, and means for locking said cam in adjusted position.

3. In a feed mill, the combination of a longitudinally movable shaft, a thrust collar mounted thereon, a pivoted lever adapted to engage with said collar, a second lever pivoted on the main frame, a link connecting said levers, an expansion spring adapted to actuate said second lever, means for regulating the tension of said spring, and adjustable means for limiting the movement of said shaft under the influence of the spring whereby the position of the shaft is controlled during operation.

4. In a feed mill, the combination of a bur case provided with inwardly projecting studs, a pivot plate adapted to be positioned over said studs whereby said plate is held against rotary movement, said bur case being provided with oppositely disposed bearing lugs upon which said pivot plate is adapted to oscillate, a rear bur plate adapted to rest against said pivot plate and to oscillate in a plane at right angles to the oscillation of said pivot plate, said bur plate being provided with a radial stud for preventing rotation of said plate, a plurality of shoulders disposed on the forward face of said bur plate, and a grinding bur fixedly secured to said plate over said shoulders.

5. In a feed mill, the combination of a revolving bur plate, a bur secured thereon, a bur case, a pivoted bur plate mounted to rock in said case, a rocking bur plate mounted to rock on said pivot plate, a stationary bur fixedly secured to the rocking plate, said pivot and rocking plates permitting the bur to rock in a plurality of planes whereby to maintain the grinding face thereof substantially parallel to the grinding face of the revolving bur.

6. In a feed mill, the combination of a hopper, a feed plate arranged at one end thereof, a longitudinally movable shaft extending through the hopper, a breaker mounted on the shaft with one end thereof abutting against the feed plate whereby to prevent an accumulation of material between the breaker and said feed plate, means connecting the breaker to the shaft and permitting longitudinal movement of the shaft relative to the breaker but causing the shaft to rotate with the breaker, and means for imparting a longitudinal movement to said shaft.

7. In a feed mill, the combination of a hopper, a shaft arranged thereon, a breaker carried by said shaft and provided with an internal groove, a gib disposed in said groove, a pin projecting through the shaft, the gib and a slot in the breaker, a grinding bur fixed on said shaft outside the hopper, means for moving the shaft longitudinally to adjust the position of the bur, and means abutting against the end of the breaker adjacent the bur to prevent an accumulation of material between the breaker and the bur, said breaker being thereby held against longitudinal movement with the shaft.

HARRY G. McCULLOCH.

Witnesses:
ETHEL A. SHANNON,
J. H. STEARNS.